United States Patent

Katzir et al.

[11] Patent Number: 5,957,581
[45] Date of Patent: Sep. 28, 1999

[54] TEMPERATURE MEASUREMENT BY ACTIVE PHOTOTHERMAL RADIOMETRY

[76] Inventors: Abraham Katzir, 15 Haim St., Afeka, 69696 Tel Aviv, Israel; Ophir Eyal, 6/16 Remez St., 47272 Ramat Hasharon, Israel; Vered Scharf, 108 Lod Rd., 67654 Tel Aviv, Israel

[21] Appl. No.: 08/866,266

[22] Filed: May 30, 1997

[30] Foreign Application Priority Data

Jun. 9, 1996 [IL] Israel ........................................ 118611

[51] Int. Cl.⁶ .................................. G01J 5/00; G01J 5/06
[52] U.S. Cl. ........................ 374/121; 374/129; 374/137
[58] Field of Search ..................... 374/121, 122, 374/126, 129–133, 137

[56] References Cited

U.S. PATENT DOCUMENTS

| 4,652,143 | 3/1987 | Wickersheim et al. | 374/161 |
|---|---|---|---|
| 4,659,234 | 4/1987 | Brouwer et al. | 374/121 |
| 4,789,992 | 12/1988 | Wickersheim et al. | 374/161 |
| 4,801,552 | 1/1989 | Hoff | 436/173 |
| 4,875,175 | 10/1989 | Egee et al. | 364/551.01 |
| 4,924,478 | 5/1990 | Tawk | 374/121 |
| 5,180,226 | 1/1993 | Mosleh | 374/127 |

Primary Examiner—Vit Miska
Attorney, Agent, or Firm—Mark M. Friedman

[57] ABSTRACT

A method of active radiometric thermometry. The target, whose temperature is to be measured, is heated briefly and locally, preferably by a pulse of laser radiation. The intensity of infrared or visible radiation emitted by the heated portion of the target is measured as a function of time. The temperature of the target is inferred from the shape of the intensity curve of the emitted radiation as a function of time.

22 Claims, 5 Drawing Sheets

Fig. 4 Black paint target temperature, (°C)

TEMPERATURE MEASUREMENT BY ACTIVE PHOTOTHERMAL RADIOMETRY

FIELD AND BACKGROUND OF THE INVENTION

The present invention relates to a method of non-contact thermometry and, more particularly, to a method of thermometry based on measuring the variation in time of induced infrared emissions of the target.

According to Planck's law, a material body at a temperature T radiates electromagnetic energy according to the following formula:

$$Q(\lambda,T,\epsilon)=\epsilon C_1\lambda^{-4}/(\exp(C_2\lambda^{-1}T^{-1})-1) \text{ photons sec}^{-1}\text{ cm}^{-1}\text{ }\mu m^{-1}$$

where $\lambda$ is the wavelength of the electromagnetic radiation, $\epsilon$ is the emissivity of the body, $C_1$ and $C_2$ are constants, and Q is the number of photons emitted into a hemisphere per unit wavelength per unit area per unit time. The emissivity $\epsilon$ depends on the wavelength $\lambda$, the temperature T, the geometry of the body, and the nature of the surface of the body.

Passive measurements of the radiation emitted by a target long have been used to measure the temperature of the target. These measurements have the advantage over other methods, such as the use of thermocouples, that the measuring device need not be in direct physical contact with the target. These methods suffer from several disadvantages, however, notably that the emissivity $\epsilon$ of the target generally is unknown. Examples of such passive radiometric techniques intended to cope with this problem by making measurements at several wavelengths include those of Brower et al., in U.S. Pat. No. 4,659,234, and Tank, in U.S. Pat. No. 4,924,478.

Active methods commonly are used to measure physical properties of the target. These active methods can be implemented in two ways. The first way is implemented by periodically modulating laser radiation. The second way, known as "pulsed photothermal radiation" (PPTR), is implemented by using a pulsed laser. In both methods, the radiation from the laser is absorbed by the target, causing a local and temporary increase of the surface temperature of the target. The resulting increase in emitted radiation, and the subsequent decrease in emitted radiation as the target cools, are measured and recorded, using a suitable detector. This record constitutes a function of time, the "photothermal decay curve", which is analyzed to infer information about the target's physical properties. These active methods have the following advantages over passive radiometry:

1. The spatial resolution of active radiometry is determined by the size of the portion of the target that is heated. If a laser is used to heat the target, this size is substantially the size of the laser spot on the target. The size of the laser spot can be on the order of the wavelength of the laser radiation. Therefore, spatial resolution can be very high.

2. In the case of weakly radiating targets, the signal-to-noise ratio can be increased by increasing the heat applied to the target.

3. Because only the time-varying part of the signal is measured, these methods are immune to both thermal and electronic drifts.

4. For the same reason, these methods are not biased by reflected fluxes that are constant in time. Therefore, they may be applied to targets in hot surroundings and to targets with high surface reflectance.

5. The temporal resolution of these methods, particularly PPTR, can be increased by decreasing the pulse duration.

Because measurements can be made in short times, measurements can be made on moving targets, such as turbine blades, and on transient targets, such as superconductors undergoing phase transitions.

For example, Egee et al., in U.S. Pat. No. 4,875,175, disclose an active radiometric method for measuring physical parameters of a layered material. Egee et al. use periodically modulated laser radiation to heat a portion of the target. A similar method (Thierry Loarer, Jean-Jacques Greffet, and Magdeleine Huetz-Aubert, "Noncontact surface temperature measurement by means of a modulated photothermal effect", Applied Optics, Vol. 29 No. 7, Mar. 1, 1990, which is incorporated by reference for all purposes as if fully set forth herein) has been used for thermometry. Like periodically modulated active radiometry, PPTR has been applied to thermometry (Thierry Loarer and Jean-Jacques Greffet, "Application of the pulsed photothermal effect to fast surface temperature measurements", Applied Optics, Vol. 31 No. 25, Sep. 1, 1992, which is incorporated by reference for our purposes as if fully set forth herein).

Loarer, Greffet, and Huetz-Aubert infer the temperature of their target from the absolute magnitude (amplitude) of the dynamic portion of the photothermal signal. Loarer and Greffet infer the temperature of their target from the absolute magnitude of the total integrated photothermal signal measured during a sampling time window. Their methods therefore suffers from the disability that they must be calibrated separately for each acquisition geometry and target emissivity. They use the dual bandpass radiometry technique, a technique well-known in the literature, in which the temperature is inferred from the ratio of photothermal signals measured at two different wavelengths. However, this technique suffers from several drawbacks. For example, the complexity of the measurement system is increased by the need for two detectors, and the measurement is independent of target emissivity and acquisition geometry only when there are no changes, or identical changes, in the optical transmittance of the two separate channels.

There is thus a widely recognized need for, and it would be highly advantageous to have, an active radiometric thermometry method that is independent of acquisition geometry and target emissivity.

SUMMARY OF THE INVENTION

According to the present invention there is provided a method for measuring a temperature of a target, comprising the steps of: (a) heating at least a portion of the target, thereby inducing an emission of emitted measurement electromagnetic radiation by said portion of the target, said emitted measurement electromagnetic radiation having at least one intensity; (b) receiving at least a portion of said emitted measurement electromagnetic radiation; (c) measuring said at least one intensity of said portion of said emitted measurement electromagnetic radiation; (d) calculating at least one normalized measurement parameter of said at least one intensity of said portion of said emitted measurement electromagnetic radiation; and (e) inferring the temperature of the target from said at least one normalized measurement parameter.

As noted above, any material body at a temperature T radiates electromagnetic energy according to Planck's law. If the surface of the body is illuminated with a laser pulse of fixed power and duration, the temperature of the body, initially at a value $T=T_0$, rises locally to a peak temperature of $T=T_0+\Delta T$. For simplicity, assume that the subsequent cooling of the body follows an exponential decay law:

$$T(t)=T_0+\Delta T\exp(-t/\tau)$$

where t is time, $\tau$ is the decay time constant determined by the thermodynamic properties of the body, $T_0$ is the temperature of the body prior to photothermal heating by the laser pulse, and $\Delta T$ is the rise in temperature induced in the body by the laser pulse. Planck's law then becomes time-dependent:

$$Q(\lambda,T_0,\Delta T,t,\tau,\epsilon)=\epsilon C_1\lambda^{-4}/(\exp(C_2\lambda^{-1}(T_0+\Delta T\exp(-t/\tau))^{-1})-1)$$

Thus, t, the decay time, can be expressed as a function of the other parameters, i.e., $t=f(\lambda,T_0,\Delta T,\tau,\epsilon)$. If the parameters $\lambda$, $\Delta T$, $\tau$, and $\epsilon$ are constant, then t is a function of $T_0$ only, and $T_0$ can be inferred from measurements of t.

In PPTR measurements, the parameters $\lambda, \Delta T, \tau$, and $\epsilon$ are, in fact, constant. $\lambda$ is the wavelength to which the detector is sensitive. This does not change in the course of the measurement. $\Delta T$ is constant because a constant energy density is used to irradiate the target. $\tau$ is determined by the thermodynamic properties of the target. In the absence of a dramatic change in the target, such as a phase transition, $\tau$ remains constant. Finally, the measurement is almost independent of $\epsilon$. Even if $\epsilon$ changes during the measurement, this does not affect the measurement as long as $\tau$ does not change. In almost all cases, $\tau$ is a weak function of $\epsilon$, because the mechanism of target cooling is primarily by diffusion of heat into the target, with cooling by radiation and by convection to the air being negligible. Thus, even a large change in $\epsilon$ causes only a negligible change in $\tau$.

It follows theoretically, and it has been verified experimentally, that the shape of the PPTR decay curve, and not its absolute magnitude, depends on the temperature and thermal parameters of the target, and is independent of both acquisition geometry and target emissivity. Therefore, any normalized parameter of the photothermal decay curve, that is, a parameter which reflects only the shape of the curve, and not its absolute magnitude, may be used as an acquisition-geometry-independent and emissivity-independent measure of the temperature of the target. This normalized parameter may be either a time-domain parameter or a frequency-domain parameter. Therefore, in the method of the present invention, active radiometric thermometry is calibrated for target type only, independent of acquisition geometry. A calibration curve is measured for each target type. Because the method is independent of acquisition geometry, the calibration is done at a convenient location, such as a laboratory, and then can be applied to non-contact thermometry in a hazardous or inaccessible location. If the cooling function of the target, that is, the function that describes how the temperature of the heated portion of the target changes with time and the optical transmittance of the system, are known, then calibration is dispensed with altogether: the cooling function is substituted for T in Planck's law, and the shape of the photothermal curve as a function of time is predicted a priori.

The scope of the present invention includes measurement of emitted radiation in any suitable spectral band. For targets at temperatures near room-temperature, the appropriate spectral band is in the mid-infrared portion of the electromagnetic spectrum. For targets at elevated temperatures, the appropriate spectral band is in the near-infrared, or even in the visible portion of the electromagnetic spectrum. Furthermore, emitted intensities may be measured at several wavelengths. Such measurements are well-known in the art, under the names of "color radiometry", multispectral radiometry", or "multiwavelength radiometry". One example of these measurements may be found in Tank, U.S. Pat. No. 4,924,478. These measurements are done by using several different detectors, or by using one or more broad spectral bandpass detectors along with a spectrometer or an assortment of narrow spectral filters that are alternately inserted in front of the detector or detectors.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method for active radiometric thermometry which can be calibrated easily for non-contact thermometry. Specifically, the present invention can be used to measure the temperatures of targets in hazardous or inaccessible locations without having to take into account the geometry of the measurement system and the emissivity of the target.

The principles and operation of active radiometric thermometry according to the present invention may be better understood with reference to the drawings and the accompanying description.

Figure 1:
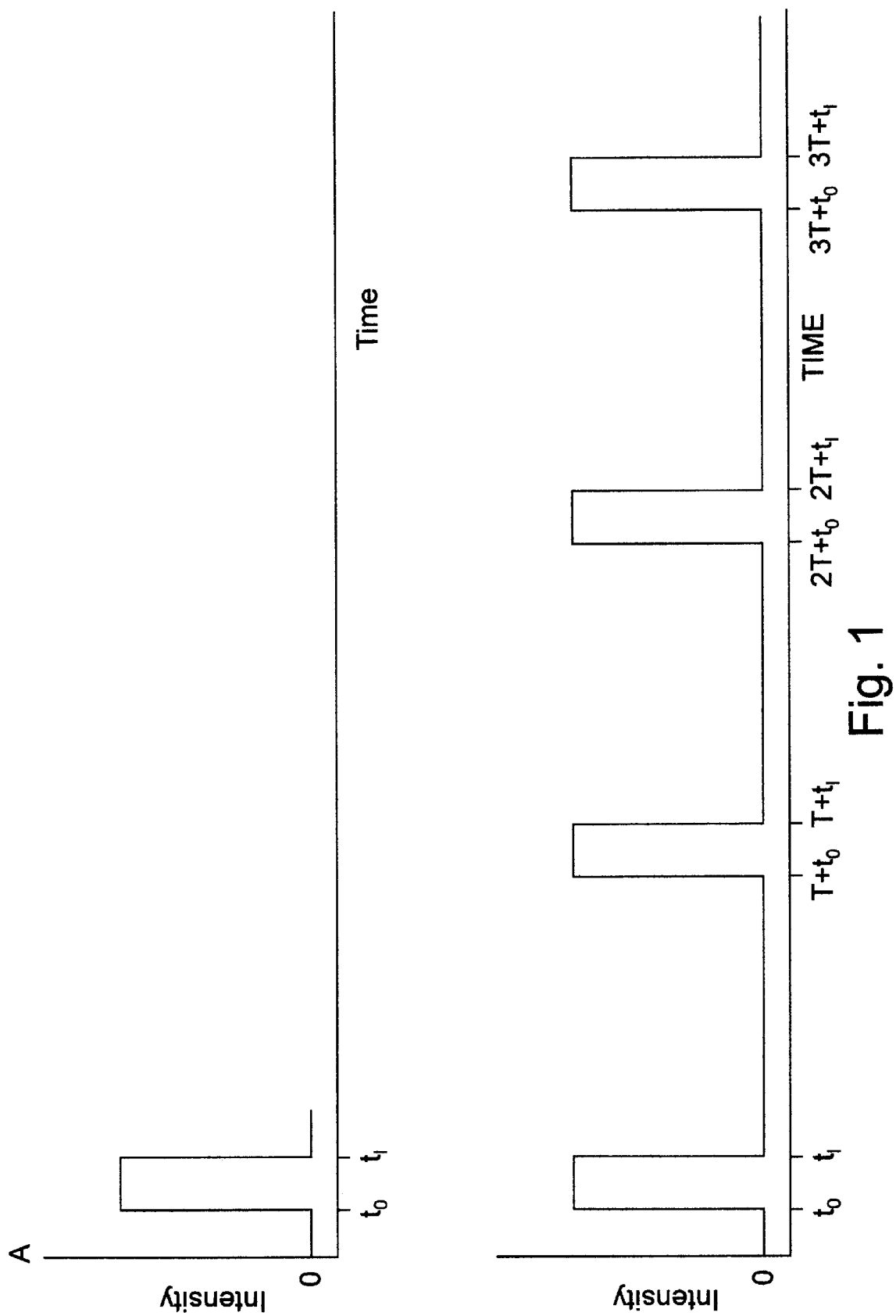
FIG. 1 shows two schematic plots of intensity profiles of radiation used to heat the target.

Referring now to the drawings, FIG. 1 shows a variety of intensity profiles suitable for heating the target. FIG. 1A shows a single pulse, characteristic of PPTR. FIG. 1B is a periodically modulated intensity profile.

FIG. 1A is a schematic plot of a PPTR incident pulse. The pulse is turned on at time $t_0$ and reaches its maximum intensity, I, almost instantaneously. The pulse remains at intensity I until time $t_f$, at which time the pulse turns off and its intensity falls almost instantaneously to zero.

Any intensity profile with a frequency spectrum similar to the frequency spectrum of the pulse of FIG. 1A is included in the scope of the present invention. It is preferable to use a periodic train of pulses, as shown in FIG. 1B. The intensity profile of FIG. 1B is the pulse of FIG. 1A repeated periodically, with a period T. Usually, T preferably is chosen to be substantially the same as the time required for the emission induced by the pulse of FIG. 1A to decay essentially to the background noise level. Thus, the frequency content of the periodic pulse train of FIG. 1B substantially matches the useful frequency content of the single pulse of FIG. 1A. In the case of a weakly radiating target and a laser of limited power, it often is preferable to make the period T shorter than the time required for pulse-induced emission to decay to the background noise level, in order to enhance the degree to which the target is heated.

The scope of the present invention includes all suitable methods for heating the target. These methods include the use of any suitable source of either electromagnetic radiation or acoustic radiation, and also particle beams, for example, a pulsed electron beam emitted by an electron gun. The scope of the present invention also includes all suitable detectors for detecting the radiation emitted by the target. Suitable detectors include, but are not limited to, photonic detectors and power detectors.

Figure 2:
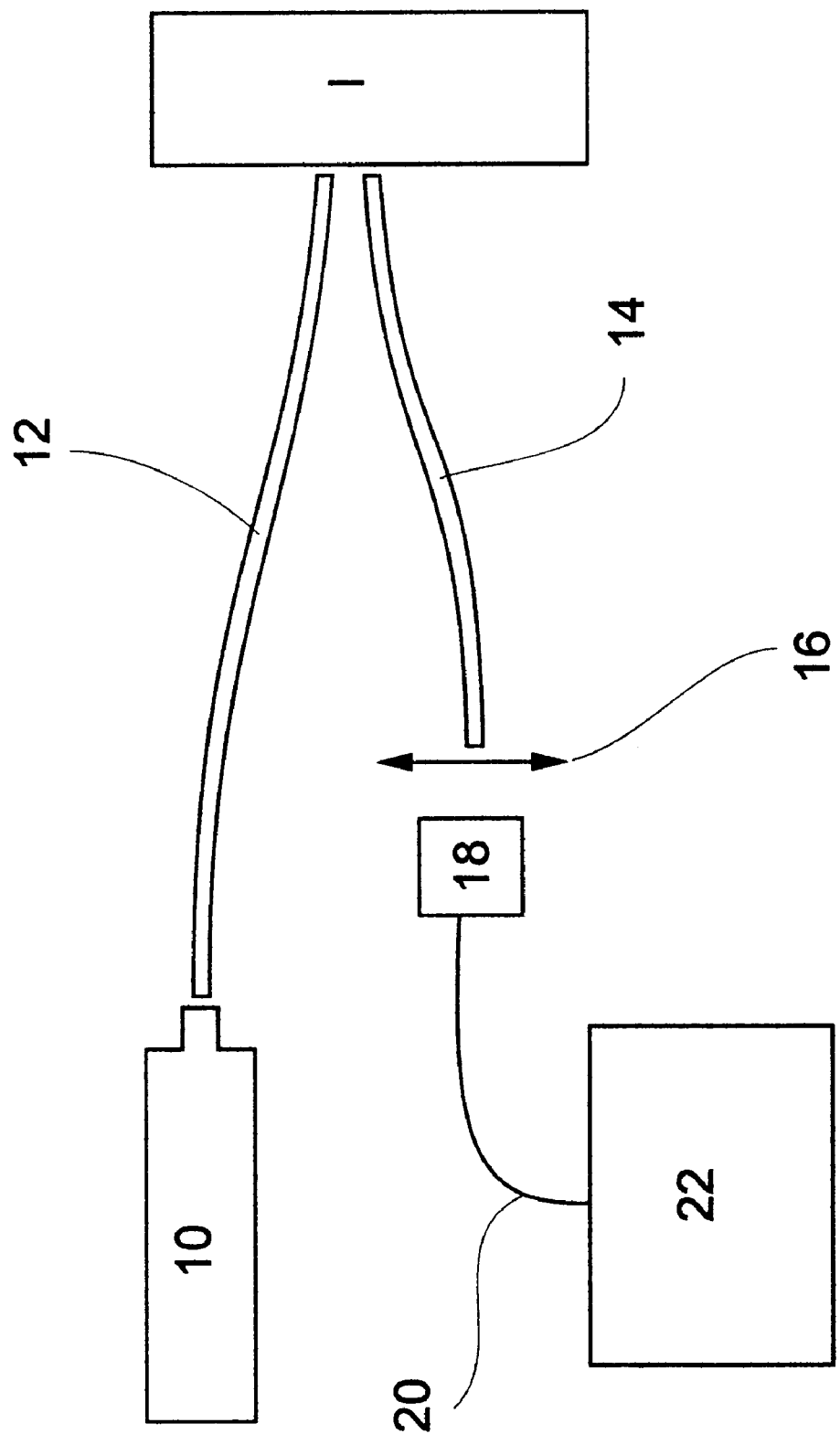
FIG. 2 is a schematic diagram of a measurement and calibration system using the method of the present invention.

FIG. 2 is a schematic diagram of a typical measurement system for PPTR thermometry. A laser 10 emits a pulse of electromagnetic radiation. This pulse is conducted by a delivery waveguide 12 to irradiate on a target 1. The pulse heats a small area of the surface of target 1. Some of the electromagnetic radiation emitted by the heated surface area of target 1 is conducted by a sensing subsystem waveguide 14 towards a suitable detector 18. A suitable optical system 16 focuses the emitted electromagnetic radiation onto detector 18. The resulting electrical signal induced in detector 18 is proportional to the intensity of the emitted electromagnetic radiation conveyed to detector 18 by sensing subsystem waveguide 14 and optical system 16. This electrical signal is conveyed by suitable means 20 to a processing system 22. Processing system 22 digitizes the signal from detector 18 and carries out subsequent digital processing as described below.

The scope of the present invention includes all suitable means for delivering the pulse from laser 10 to target 1 and for conducting the emitted radiation to detector 18. Waveguides 12 and 14 may be single optical fibers, optical fiber bundles, or hollow waveguides with reflective interior coatings. In addition to waveguides 12 and 14, or instead of waveguides 12 and 14, these means may include a variety of suitable optical elements, for example, lenses, mirrors, and optical filters.

In the experiments described below, laser 10 was a carbon dioxide laser emitting infrared radiation with a wavelength of 10.6 microns. Waveguides 12 and 14 were silver halide fibers of composition $AgCl_{0.5}Br_{0.5}$, 0.9 mm in diameter and 1 meter long. These fibers have polycrystalline structure, are flexible, insoluble in water, non-toxic, and have high transmission in the mid-infrared band (3 to 25 microns) with losses of 0.2 dB/meter at 10.6 microns. The fibers of waveguides 12 and 14 were covered by teflon tubes 2 mm in diameter to isolate them mechanically from the environment. The distal ends of waveguides 12 and 14 were held at a distance of approximately 2 to 5 millimeters from the target. Detector 18 was a 2 mm diameter Graseby Infrared InSb liquid nitrogen cooled photonic detector. This detector is sensitive to wavelengths between 2 microns and 5 microns, with a detectivity of $D^*=24\times10^9$ $W^{-1}$ cm $Hz^{1/2}$(5 micron, 1 kHz, 1 Hz).

Figure 3:
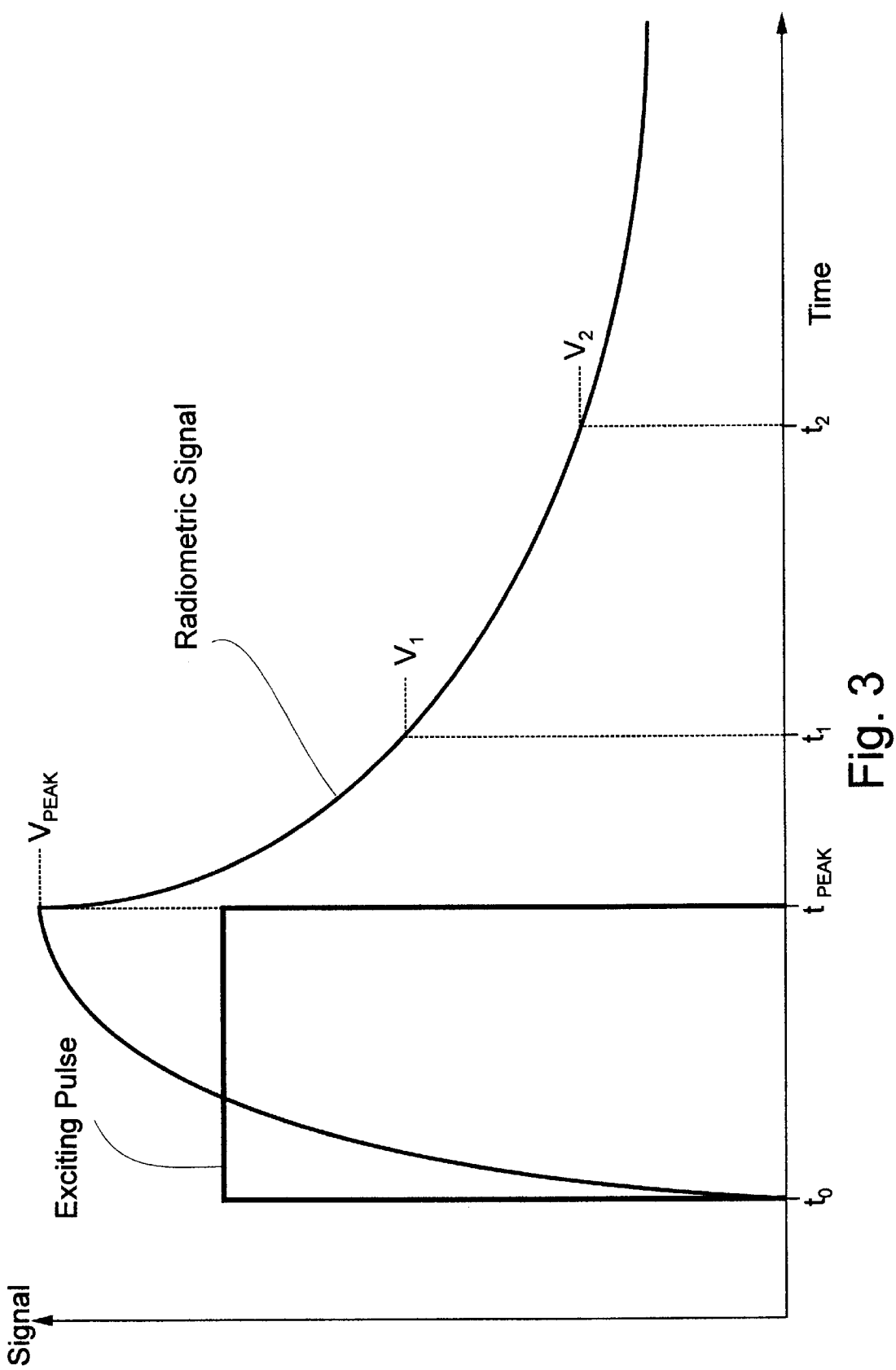
FIG. 3 is a sketch of the features of a photothermal decay curve.

FIG. 3 is a generalized sketch of the photothermal decay signal measured by detector 18. The pulse emitted by laser 10 heats target 1, from initial time $t_0$ until a time labeled $t_{PEAK}$ in FIG. 3. Time $t_{PEAK}$ is essentially the same as time $t_f$, in FIG. 1A. As the surface of target 1 is heated, it emits more and more electromagnetic radiation, some of which is conveyed via sensing subsystem waveguide 14 and optical system 16 to detector 18. As the intensity of the emitted radiation increases, the signal induced in detector 18 also increases, from zero at time $t_0$ to a maximum value, $V_{PEAK}$, at time $t_{PEAK}$.

After the pulse from laser 10 is turned off, the signal induced in detector 18 gradually decays to zero with a decay time that characterizes the shape of the photothermal decay curve. This decay time may be defined in many ways. A preferred definition is based on choosing two signal levels, $V_1$ and $V_2$. $V_1$ is a first fraction of $V_{PEAK}$. $V_2$ is a second, smaller fraction of $V_{PEAK}$. A first time, $t_1$, is defined as the time at which the decaying signal falls to the level $V_1$. A second time, $t_2$, is defined as the time at which the decaying signal falls to the level $V_2$. The decay time is defined as the difference between $t_2$ and $t_1$.

The shape of the photothermal decay curve may be characterized in other ways. In one preferred way, two times, $t_a$ and $t_b$, are chosen. Let $V_a$ be the value of the signal level at time $t_a$. Let $V_b$ be the value of the signal level at time $t_b$. A parameter that characterizes the shape of the photothermal decay curve is the ratio $V_a/V_b$.

Figure 4:
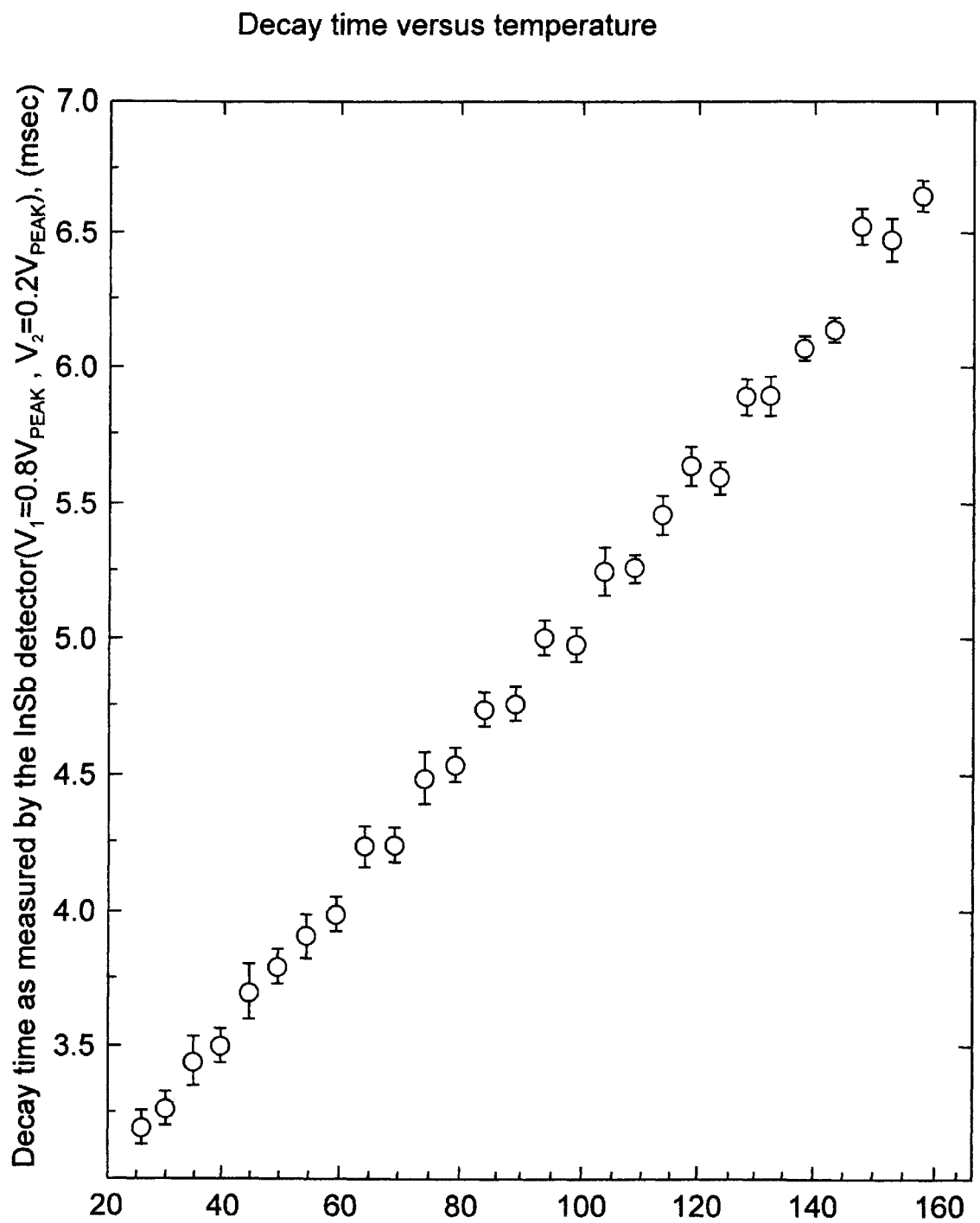
FIG. 4 is a graph of measured decay times vs. temperature, for a black paint target.
Figure 5:
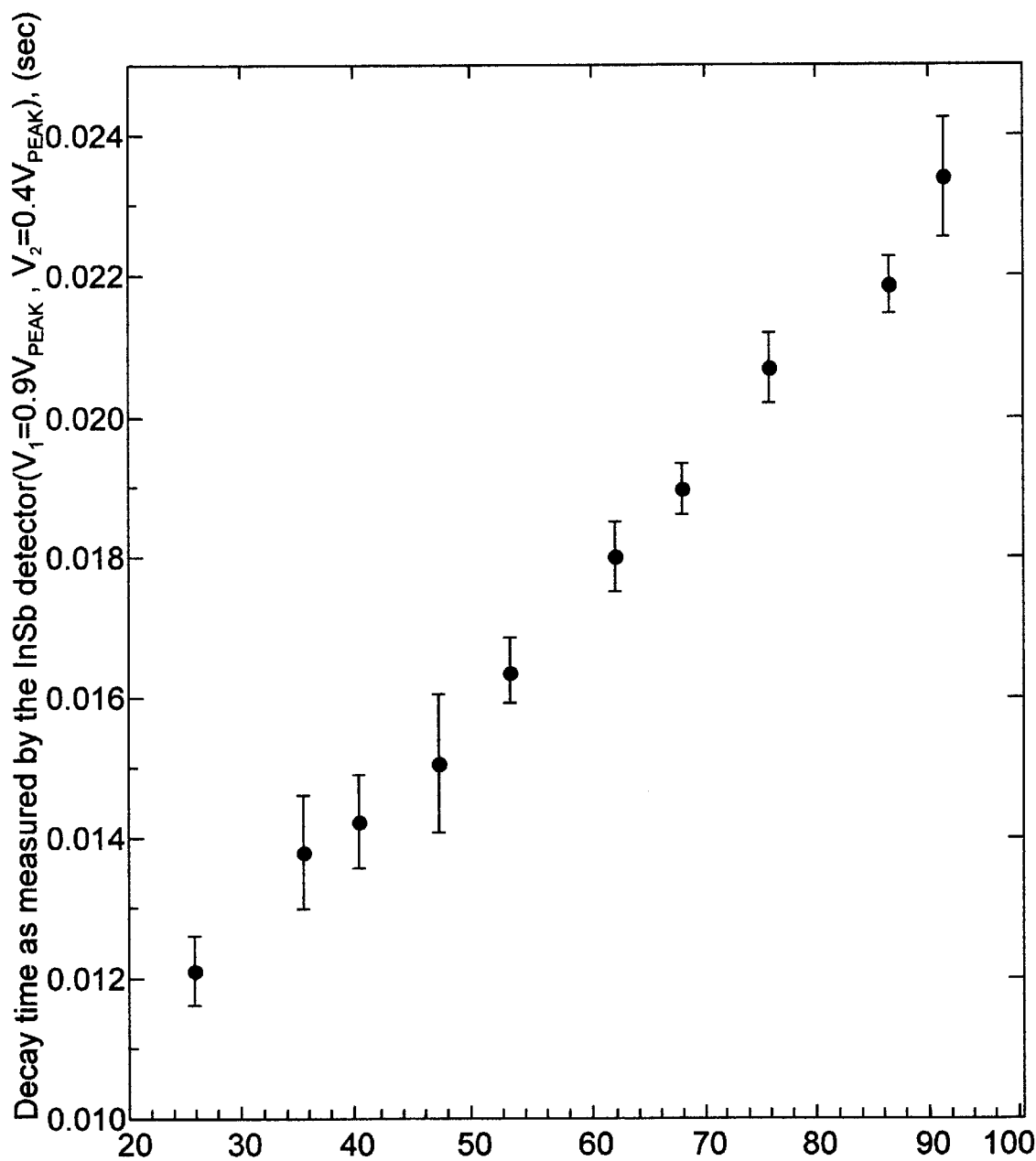
FIG. 5 is a graph of measured decay times vs. temperature, for a partinex target.

FIGS. 4 and 5 illustrate experimental results obtained using the measurement system of FIG. 2. FIG. 4 shows results of experiments in which target 1 was a layer of black paint, about 100 microns thick, on a metal substrate. The black paint layer had an emissivity close to 1, and an absorption spectrum close to 1, and therefore closely approximated a black body. The temperature of target 1 was controlled by a thermoelectric heater. Each of the pulses generated by carbon dioxide laser 10 had a duration of about 2.5 milliseconds and an energy level of about 27 millijoules. The laser spot on target 1 was about 2 millimeters in diameter. Measurements were repeated 20 times at each of the temperatures shown on FIG. 4. The plotted circles are the averages of each series of 20 measurements, and the error bars are the corresponding standard deviations.

The circles plotted in FIG. 4 mark the times required for the photothermal decay signal to decay from 80% of its peak value to 20% of its peak value, at the temperatures shown. The decay time defined in this way clearly is a monotonic, nearly linear function of target temperature.

FIG. 5 shows similar results for a target made of a different material, one which does not emulate a black body. In the experiments plotted in FIG. 5, target 1 was a partinex block about 0.5 centimeters thick. FIG. 5 shows the time required for the photothermal decay signal to decay from 90% of its peak value to 40% of its peak value at various temperatures.

While the invention has been described with respect to a limited number of embodiments, it will be appreciated that many variations, modifications and other applications of the invention may be made.

What is claimed is:

1. A method for measuring a temperature of a target, comprising the steps of:

(a) heating at least a portion of the target, thereby inducing an emission of emitted measurement electromagnetic radiation by said portion of the target, said emitted measurement electromagnetic radiation having at least one intensity;

(b) receiving at least a portion of said emitted measurement electromagnetic radiation;

(c) measuring said at least one intensity of said portion of said emitted measurement electromagnetic radiation;

(d) calculating at least one normalized measurement parameter of said at least one intensity of said portion of said emitted measurement electromagnetic radiation; and (e) inferring the temperature of the target from said at least one normalized measurement parameter.

2. The method of claim 1, wherein said heating is done by irradiating measurement electromagnetic radiation on said portion of the target, said measurement electromagnetic radiation having a time-varying intensity profile.

3. The method of claim 2, wherein said measurement electromagnetic radiation is infrared radiation.

4. The method of claim 3, wherein said infrared radiation is emitted by a carbon dioxide laser.

5. The method of claim 2, wherein said time-varying intensity profile includes at least one pulse.

6. The method of claim 2, wherein said time-varying intensity profile is modulated periodically.

7. The method of claim 6, wherein said time-varying intensity profile includes at least one train of a plurality of pulses.

8. The method of claim 2, wherein said step of irradiating of said measurement electromagnetic radiation on the target is done using a delivery waveguide.

9. The method of claim 8, wherein said delivery waveguide includes at least one silver halide fiber.

10. The method of claim 2, wherein said step of irradiating of said measurement electromagnetic radiation on the target is done using a delivery optical system containing at least one component selected from the group consisting of lenses, mirrors, and optical filters.

11. The method of claim 1, wherein said receiving of said portion of said emitted measurement electromagnetic radiation is done using a sensing subsystem waveguide.

12. The method of claim 11, wherein said sensing subsystem waveguide includes at least one silver halide fiber.

13. The method of claim 1, wherein said receiving of said portion of said emitted measurement electromagnetic radiation is done using a sensing optical system containing at least one component selected from the group consisting of lenses, mirrors, and optical filters.

14. The method of claim 1, wherein said portion of said emitted measurement electromagnetic radiation is received within at least one spectral bandpass.

15. The method of claim 14, wherein at least one of said at least one spectral bandpass includes at least one wavelength of visible radiation.

16. The method of claim 15, wherein at least one of said at least one spectral bandpass includes at least one wavelength of infrared radiation.

17. The method of claim 1, wherein said measuring of said at least one intensity is done using a detector selected from the group consisting of photonic detectors and power detectors.

18. The method of claim 1, wherein said at least one normalized measurement parameter includes at least one decay time.

19. The method of claim 18, wherein said intensity of said portion of said emitted measurement electromagnetic radiation has a peak value, and wherein said decay time is a difference between a first time and a second time, said first time being a time whereat a first of said at least one intensity of said portion of said emitted measurement electromagnetic radiation is a first fraction of said peak value, and said second time being a time whereat a second of said at least one intensity of said portion of said emitted measurement electromagnetic radiation is a second fraction of said peak value.

20. The method of claim 1, wherein said at least one normalized parameter includes at least one ratio between a first of said at least one intensity of said portion of said emitted measurement electromagnetic radiation and a second of said at least one intensity of said portion of said emitted measurement electromagnetic radiation, said first intensity being measured at a first time, and said second intensity being measured at a second time.

21. The method of claim 1, wherein said step of inferring the temperature of the target is based on a cooling function of the target.

22. The method of claim 1, further comprising the steps of:

for each of a plurality of calibration temperatures:
(a) imposing said calibration temperature on a calibration object;
(b) heating at least a portion of said calibration object, said portion of said calibration object being substantially identical in composition to said portion of the target, thereby inducing an emission of emitted calibration radiation by said calibration object, said emitted calibration radiation having at least one intensity;
(c) receiving at least a portion of said emitted calibration radiation;
(d) measuring said at least one intensity of said portion of said emitted calibration radiation; and
(e) calculating at least one normalized calibration parameter of said at least one intensity of said portion of said emitted calibration radiation, said at least one normalized calibration parameter being substantially identical to said at least one normalized measurement parameter.

* * * * *